United States Patent [19]

Spechtel

[11] Patent Number: 5,613,908
[45] Date of Patent: Mar. 25, 1997

[54] SELF-PROPELLING PROCESSING MACHINE

[75] Inventor: Josef Spechtel, Versmold, Germany

[73] Assignee: Claas Chg Beschrankt Haftende Offene Handelsgesellschaft, Harsewinkel, Germany

[21] Appl. No.: 511,550

[22] Filed: Aug. 4, 1995

[30] Foreign Application Priority Data

Sep. 14, 1994 [DE] Germany .............. 44 32 706

[51] Int. Cl.$^6$ .................................. A01F 21/00
[52] U.S. Cl. ........................... 460/119; 296/190
[58] Field of Search ................ 460/119, 150; 56/14.5; 296/35.3, 190

[56] References Cited

U.S. PATENT DOCUMENTS

| | | | |
|---|---|---|---|
| 3,737,192 | 6/1973 | Hirsch | 296/190 |
| 4,427,090 | 1/1984 | Fredriksen et al. | 296/190 X |
| 4,652,043 | 3/1987 | Hurlburt | 296/146.11 X |
| 4,957,324 | 9/1990 | Doescher et al. | 296/190 |

FOREIGN PATENT DOCUMENTS

| | | |
|---|---|---|
| 1580314 | 2/1965 | Germany . |
| 1966425 | 5/1967 | Germany . |
| 1657019 | 2/1968 | Germany . |
| 1755309 | 4/1968 | Germany . |
| 1991880 | 5/1968 | Germany . |
| 7506669 | 3/1975 | Germany . |
| 2531890 | 7/1975 | Germany . |

*Primary Examiner*—Terry Lee Melius
*Attorney, Agent, or Firm*—Michael J. Striker

[57] ABSTRACT

A self-propelling processing machine, in particular an agricultural harvesting machine has an axle receiving front wheels, a removable attachment, a driver's cabin located above the axle, a substantially horizontal inlet platform located at an outlet side of the driver's cabin, an outlet being arranged in a free space between a respective one of the front wheels which is associated with the inlet platform and the attachment, and a walkable outlet platform mounted on the attachment at a side facing the outlet in a position substantially corresponding to a position of the outlet.

7 Claims, 1 Drawing Sheet

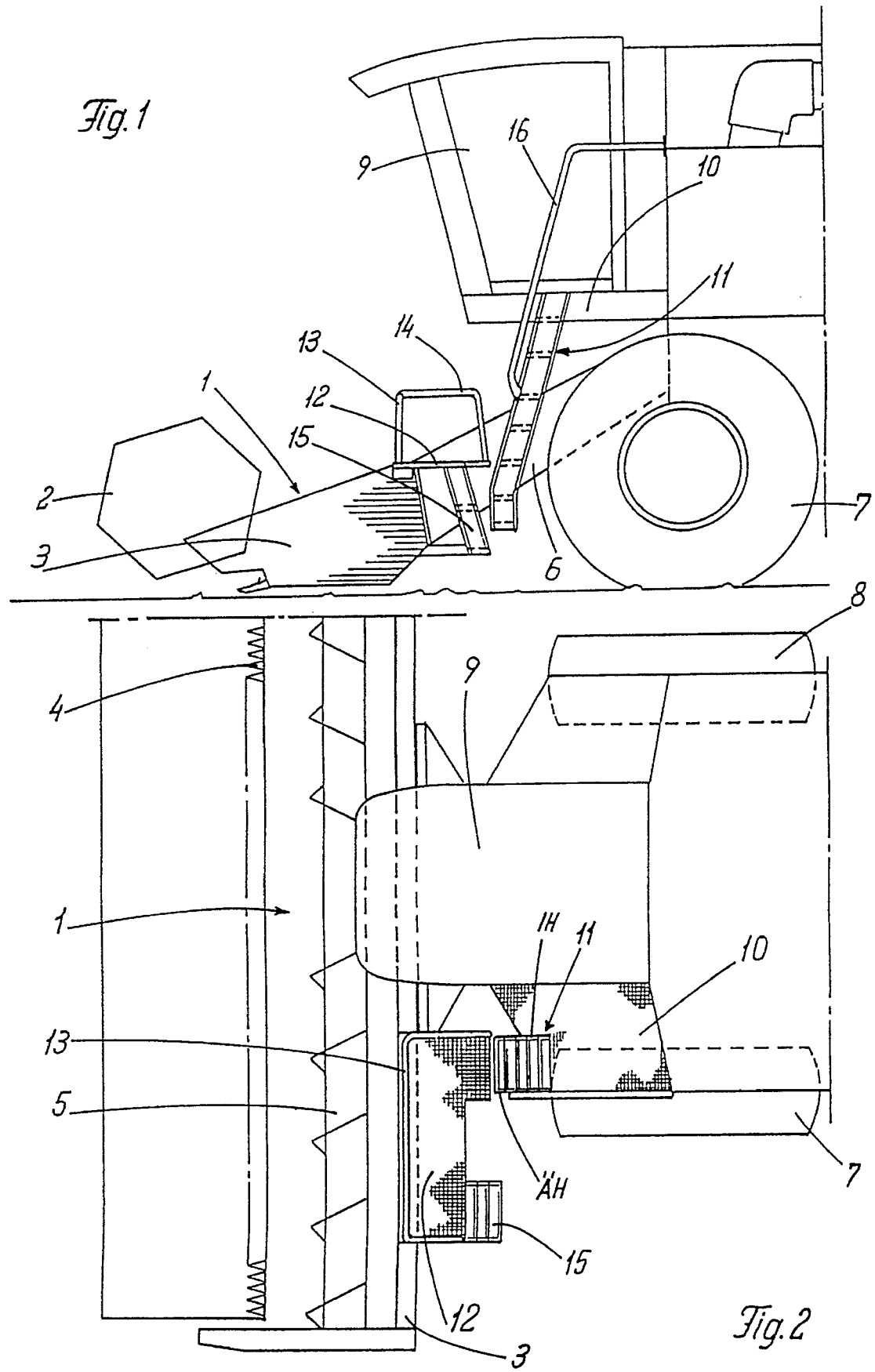

SELF-PROPELLING PROCESSING MACHINE

BACKGROUND OF THE INVENTION

The present invention relates to a self-propelling processing machine.

More particularly, it relates to an agricultural harvesting machine which has a driven axle which receives front wheels, a removable supply device with a driver's cabin provided above the drive axle, with a horizontal entry platform located at an entry side and a step or ladder-shaped outlet. Such self-propelling processing machines include for example a harvester thresher with a cutting mechanism having a cutting width which is substantially greater than a permissible width of a vehicle allowed for the street transportation. It is therefore necessary to arrange the cutting mechanism removably on the inclined transporting passage of the harvester thresher by fast couplings, so that the driver can uncouple the cutting mechanism in a shortest possible time for a street transportation and to load the same on a suspending device designed for the transportation of the attachment. Because of the great cutting width of the harvester thresher, the width of the front wheels is also correspondingly great. The harvester thresher moreover is provided with twin wheels. Furthermore, the front wheels are spaced from one another by a distance which corresponds to the permissible width of a vehicle.

The outlet is located in such processing machines in the vicinity of the front wheel provided at the inlet side. The outlet must be formed so that the driver can reach its working place in the driver's cabin comfortably. For this purpose it must be guaranteed that the permissible width of the processing machine during the street transportation is not exceeded by the outlet. For this purpose it has been proposed to turn the outlet around a vertical axis located in the upper region so that during the output it is located laterally near the front wheel and during the travel is located in front or behind the front wheel. These solutions are disclosed in German patent documents DE-OS 15 80 314, DE-OS 25 31 890 and GM 19 66 425. This turnability is used to protect the output from damages in the ground. This solution has however the disadvantage that both the turning support as well as the output itself must be formed very stable to avoid high vibrations which can lead to material cracks and breakages. It is also necessary to secure the both possible rotary end positions of the outlet. This has been performed manually. If the driver forgets to secure the outlet or the locking mechanism does not operate orderly due to eventual dirt deposits, there is a substantial risk of malfunction.

It is further known to turn the outlet upwardly about an upper horizontal axis. This approach is disclosed in the German patent document DE-GM 19 91 880. However, the construction here is very complicated. Moreover, in such a construction the driver has to be apply a relatively high force for turning the output. It is also known to suspend the outlet on a rod system operating similar to a parallel guiding drive. In this construction the outlet can be displaced from a position laterally near the front wheel to a position located above the front wheel. This approach is disclosed in the German patent document DE-PS 16 57 019. In this embodiment the construction is also very complicated and expensive and the driver must displace the outlet.

SUMMARY OF THE INVENTION

Accordingly, it is an object of the present invention to provide a self-propelling processing machine of the above mentioned type, which avoids the disadvantages of the prior art.

More particularly, it is an object of the present invention to provide a self-propelling processing machine in which the output can be mounted by the driver comfortably, and is located so that it is protected from any damages and at the same time does not exceed the permissible width of a vehicle.

In keeping with these objects and with others which will become apparent hereinafter, one feature of the present invention resides, briefly stated, in a processing machine in which the outlet is located stationarily in a free space between a front wheel associated with an input platform and an attachment, and a walkable output platform is mounted for this purpose on the attachment in a proper position at the side facing the output.

In the inventive processing machine, the output formed as stairs or ladder is fixedly connected with the housing of the harvester thresher and therefore can be formed relatively light. The driver can reach the driver cabin in extremely comfortable way since first it steps on the output platform mounted on the cutting mechanism and from there reaches the stairs or steps of the output. The handles for the driver required for conversion of the output are dispensed with, so that it is not loaded. Due to the stationary mounting of the output and the fixed arrangement of the output platform, bearing parts are dispensed with. Therefore the number of components is minimal. In addition, rattling noise caused by bearing play is avoided.

In accordance with a further embodiment of the present invention, the inner longitudinal side of the outlet platform which faces the driver's cabin coincides with the inner member of the output, and the opposite outer longitudinal side of the outlet platform is offset outwardly relative to the outer member of the output. Since the outlet platform has a greater width than the outlet, a lateral overhang is produced so that it is possible to step on the outlet platform without problems.

For overcoming of great heights during stepping on the output platform, an auxiliary output is fixed on the outer side at the side of the outlet platform which faces the outlet. The number of the stairs of the step ladder is substantially smaller than the number of the stairs or steps of the outlet. The lateral overhang of the outlet platform is used as an axis to the outlet.

The outlet platform has an extension in the region of the outlet end and its width which is as close as possible to the same to avoid dangerous gaps between both elements. For this purpose also the outlet platform is located at the same height as the step of the outlet. For providing safety of the driver during stepping in the driver's cabin, a U-shaped safety bracket which is open toward the outlet is fixed on the outlet platform. It is located at a sufficient distance from the outlet platform and is mounted on the outlet platform by vertically located steps.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a front part of a self-propelling processing machine formed as a harvester thresher in accordance with the present invention; and FIG. 2 is a partial plan view of the front part of the inventive self-propelling processing machine.

DESCRIPTION OF THE PREFERRED EMBODIMENTS

A harvester thresher in accordance with the present invention has front parts which are shown in FIGS. 1 and 2. The harvester thresher is provided with a removable attachment which is identified as a whole with reference numeral 1. The removable attachment has a rotatably driven drawing-in reel 2, a mowing table 3, an oscillatingly operating cutter 4, and a screw conveyor 5. The attachment 1 is connected with an inclined transporting passage 6 by fast couplings in a not shown manner.

Front wheels 7 and 8 are arranged on a driveable axle and located behind the attachment 1 as considered in a forward traveling direction, so as to form a free space therebetween. A driver's cabin 9 is arranged above the free space. A horizontal inlet platform 10 is arranged at a left side of the driver's cabin 9 as considered in the traveling direction. The inlet platform 10 is located above the associated front wheel 7. A downwardly oriented inclined outlet 11 is mounted by its upper end on the input platform 10. The outlet 11 is formed as a ladder with its stairs extending parallel to and at a distance from the front axle. The lower end is located at such a distance from the ground, that the driver with the removed attachment 1 can easily step on the lower stair. The outlet 11 is located between the attachment 1 and the associated front wheel 7.

A horizontally projecting outlet platform 12 is mounted on the attachment 1 at the side facing the outlet 11. It is however offset upwardly relative to the lower end of the outlet 11. In the shown embodiment the outlet platform 12 is located between the second and third steps of the outlet 11 if counted from below. The width of the outlet platform 12 is substantially greater than the width of the outlet 11. The inner longitudinal side of the outlet platform 12 which faces the driver's cabin 9 substantially coincides with the inner element of the outlet 11. The outer longitudinal side of the outlet platform 12 is substantially offset from the outer element of the outlet 11. Because of this offset, it is easy to climb on the outlet platform 12.

A safety bracket 13 is mounted on the outlet platform 12 above and at a distance from it by straight supports 14. The safety bracket 13 is U-shaped and opens toward the outlet 11. For easily overcoming the distance from the outlet platform 12 to the bottom, also an auxiliary outlet 15 is provided at the outer region of the outlet platform 12 at the side facing the outlet 11. In the shown example it is formed as ladder with two stairs. A hand rail 16 is mounted on the outlet 11 at the outer side. The hand rail extends substantially to half height of the driver's cabin 9.

When the attachment 1 is removed the driver can easily reach the driver's cabin 9, since the outlet 11 in the lower region is then free. When the attachment 1 is mounted, the climbing of the output 11 is also possible without any problems, since the driver does not have to step in the narrow free space between the outlet 11 and the attachment 1.

It will be understood that each of the elements described above, or two or more together, may also find a useful application in other types of constructions differing from the types described above.

While the invention has been illustrated and described as embodied in a self-propelling processing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A self-propelling processing machine, in particular an agricultural harvesting machine, comprising an axle receiving front wheels; a removable attachment; a driver's cabin located above said axle; an outlet provided for said driver's cabin; a substantially horizontal inlet platform located adjacent to said driver's cabin at a side of said outlet, said outlet being arranged in a free space between a respective one of said front wheels which is associated with said inlet platform and said attachment; and a walkable outlet platform mounted on said attachment at a side facing said outlet in a position substantially corresponding to a position of said outlet.

2. A self-propelling processing machine as defined in claim 1, wherein said outlet platform has a first longitudinal side facing said driver's cabin and a second opposite longitudinal side, said outlet having an inner element and an outer element arranged so that, said first longitudinal side of said outlet platform which faces said driver's cabin coincides with said inner element of said outlet, while said second opposite longitudinal side of said outlet platform is outwardly offset relative to said outer element of said outlet.

3. A self-propelling processing machine as defined in claim 1, wherein said outlet has a step, said outlet platform in a region which is opposite to said outlet being located near said step of said outlet and arranged at a same height with said step.

4. A self-propelling processing machine as defined in claim 1; and further comprising an auxiliary outlet mounted on an outwardly offset part of said outlet platform at a side facing said outlet.

5. A self-propelling processing machine as defined in claim 1; and further comprising a safety bracket which is mounted on said outlet platform.

6. A self-propelling processing machine as defined in claim 5, wherein said safety bracket is open toward said output.

7. A self-propelling processing machine as defined in claim 1; and further comprising an auxiliary output mounted on an outwardly extending part of said outlet platform, said outlet platform together with said auxiliary outlet being removably connected with said attachment.

\* \* \* \* \*